United States Patent

Memon

[11] Patent Number: 5,851,276
[45] Date of Patent: Dec. 22, 1998

[54] CRUMB RUBBER MODIFIED ASPHALT WITH IMPROVED SETTLING PROPERTIES

[75] Inventor: G. Mohammed Memon, Sterling, Va.

[73] Assignee: The United States of America as represented by the Secretary of Transportation, Washington, D.C.

[21] Appl. No.: 922,605

[22] Filed: Sep. 3, 1997

Related U.S. Application Data

[63] Continuation-in-part of Ser. No. 662,750, Jun. 10, 1996, abandoned.

[51] Int. Cl.$^6$ .................................................. C09D 195/00
[52] U.S. Cl. ............................ 106/281.1; 524/59; 524/71
[58] Field of Search ........................... 106/281.1; 524/71, 524/59

[56] References Cited

U.S. PATENT DOCUMENTS 4,833,205  5/1989  Bauman et al. ......................... 525/123
5,501,730  3/1996  Duong et al. ......................... 106/281.1

OTHER PUBLICATIONS

Verlinskaya et al., CA 108:22728 "Chemisorption of latexes . . . ", Sep. 1987.

Bissada et al., CA 100:196831 "Evaluation of rubberzied limestone filler in asphalt", Jan. 1984.

"PU Incorporating Surface–Modified Particles, Fibers" Dr. Bernard Bauman No date avail.

*Primary Examiner*—David Brunsman
*Attorney, Agent, or Firm*—Otto M. Wildensteiner

[57] ABSTRACT

An improved asphalt having enhanced settling properties. The asphalt includes crumb rubber particles which have been treated to produce a greater number of carboxylic sites on the surface of the crumb rubber. These carboxylic sites interact with the functional groups in the asphalt, resulting in a homogeneous mixture having improved separation characteristics as well as the improved rheological properties due to the inclusion of the crumb rubber particles.

10 Claims, 1 Drawing Sheet

| Asphalt | Original Low Temp. °C | Control Low Temp. °C | Modified Low Temp. °C | Original High Temp. °C | Control High Temp. °C | Modified High Temp. °C |
|---|---|---|---|---|---|---|
| AAD-1 | -31 | -28 | -33 | 63 | 80 | 81 |
| ABM-1 | -24 | -27 | -29 | 66 | 69 | 72 |
| AAM-1 | -23 | -30 | -33 | 66 | 68 | 71 |

CRUMB RUBBER MODIFIED ASPHALT WITH IMPROVED SETTLING PROPERTIES

The present application is a continuation in part of application Ser. No. 08/662,750 filed Jun. 10, 1996 now abandoned.

STATEMENT OF GOVERNMENT INTEREST

The present invention may be made or used by or on behalf of the Government of the United States without the payment of any royalty thereon or therefor.

BACKGROUND

The unique chemistry and internal molecular association of asphalt are responsible for its mechanical properties and hence for its use as a binder in asphalt concrete pavement. Large tonnages of asphalt are used every year in constructing roads throughout the world; thus any improvement in its properties, no matter how small, translates into considerable cost savings. The present invention is a means and method of improving the rheological properties of crumb rubber modified asphalt which is later used in pavement.

Adding crumb rubber to hot asphalt results in improved properties such as a wider useful temperature range. However, reports of performance of prior art crumb rubber modified asphalt concrete vary considerably; some pavements ravel after only a limited amount of use, sometimes there is a decrease in the mechanical properties of the binder, and sometimes there are inconsistencies in the applicability of the asphalt concrete in the field. These variations result from differences in the types of asphalt; the source, composition, size, and process of making the crumb rubber particles; and in the process of incorporating the crumb rubber particles into the asphalt. One of the primary problems with prior art crumb rubber modified asphalt binder is that it has poor settling characteristics; that is, the crumb rubber particles tend to settle or to produce new molecular size particulates which tend to settle to the bottom of the tank before the asphalt is mixed with aggregate. Another problem is that the particles do not disperse evenly through the asphalt. This may contribute to the problems noted above, particularly the ravelling.

It has been found that the quality of the asphalt after the addition of the crumb rubber is a function of the amount of interaction between the asphalt and the crumb rubber particles, which in turn is a function of the number of carboxylic sites on the surfaces of the particles. When the particles have a large number of carboxylic sites, they mix more evenly due to interaction with asphalt functional groups and the final product is much smoother; the crumb rubber particles also stay in suspension to a much greater degree than before.

OBJECTS OF THE PRESENT INVENTION

Accordingly, it is an object of the present invention to provide a crumb rubber modified asphalt that has improved rheological properties.

It is a further object to provide such a crumb rubber modified asphalt that has improved settling characteristics.

It is a further object to provide such a crumb rubber modified asphalt that can be prepared using readily available materials.

It is a further object to provide such a crumb rubber modified asphalt that is environmentally benign both in its preparation and its use.

It is a further object to provide a means and method for increasing the number of carboxylic sites on crumb rubber that is to be added to asphalt.

SUMMARY

Figures 1, 2:
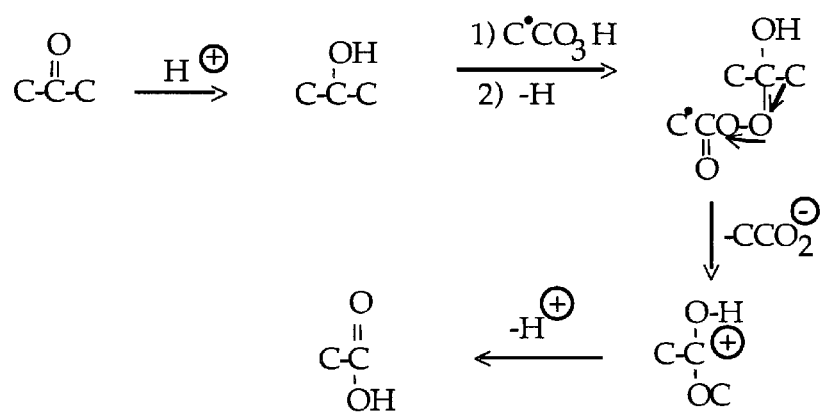
FIG. 1 shows the improvement in the rheological properties of asphalts AAD-1, ABM-1, and AAM-1 using the present invention.
FIG. 2 shows a possible mechanism for the creation of the carboxylic sites on the crumb rubber.

Briefly, the present invention is the creation of carboxylic sites on the surface of crumb rubber particles that are later added to asphalt. This is done by treating the crumb rubber particles with a carbonium ion-generating material such as hydrogen peroxide. The hydrogen peroxide first creates carbonium ions on the surface of the crumb rubber particles, then converts these ions to carboxylic sites. The functional groups in asphalt and the carboxylic sites on the crumb rubber particles interact with each other. Since the treated particles have more carboxylic sites than untreated particles, there is a greater interaction between the asphalt and the treated particles. This produces a crumb rubber modified asphalt that has the desired rheological properties; i.e. has an increased useful temperature range over that made with untreated crumb rubber particles.

DESCRIPTION OF THE PREFERRED EMBODIMENT

Prior art crumb rubber modified asphalt is made by simply adding crumb rubber to asphalt. While this increases its operating temperature range, the asphalt is subject to ravelling and other problems. These effects are thought to be at least partially the result of the fact that the crumb rubber particles tend to form clumps and settle out of the asphalt while it is still in the melting tank before being added to aggregate.

The present invention alleviates this problem by treating the crumb rubber particles so that the asphalt interacts with them more than it does with untreated particles. When the treated particles are added to the asphalt they are more fully dissolved in and suspended in the asphalt, thereby reducing the problems which are thought to be a result of the settling out of the particles in the prior art crumb rubber modified asphalt.

The crumb rubber particles of the present invention are treated with a carbonium ion-generating material such as hydrogen peroxide. Hydrogen peroxide first creates carbonium ions at the carbon black by utilizing its oxygenated sites on the surface of the particles, then converts these carbonium ions to carboxylic sites. The treated particles thus have more carboxylic sites than untreated prior art particles. The functional groups in the asphalt then interact with the carboxylic sites, thereby causing the treated crumb rubber particles to dissolve in and be suspended in the asphalt to a much greater degree than untreated particles. This results in an increase in the useful temperature range over and above that which is obtained from adding prior art untreated particles to asphalt and a decrease in the ravelling and other problems noted above.

It is desirable that the crumb rubber particles be as small as possible so that they are most easily dissolved in and suspended in the asphalt. The particles used in the examples were all −80 mesh size and 15% by weight of the asphalt.

Since crumb rubber is more expensive than asphalt, 15% is the maximum that is presently used in crumb rubber modified asphalt. Therefore that is the amount that was used in the examples, although it may be possible to use more as a result of the increased interaction of the asphalt with the improved particles of the present invention.

The particles were treated by mixing them with hydrogen peroxide at a temperature of about 65–85 degrees Centigrade while stirring for about 20 to 30 minutes to produce a freely-flowing powder. They were then sprinkled on the surface of the asphalt at a temperature of about 143–183 degrees Centigrade after which it was stirred for about one and a half hours while maintaining the temperature. For AAM-1 asphalt the amount of hydrogen peroxide was 0.035 millimoles of peroxide per gram of asphalt; for AAD-1 it was 0.025 millimoles per gram; and for asphalt ABM-1 it was 0.040 millimoles per gram. These amounts were experimentally determined and are optimized to produce the best results. The optimum amount of hydrogen peroxide is a function of the polar compounds and functional groups in the asphalt; it will generally fall within the range of about 0.02 to about 0.06 millimoles per gram of asphalt.

FIG. 1 shows the improvement in rheological properties of the modified asphalt of the present invention. As can be seen, unmodified grade AAD-1 asphalt has a temperature range of −31 degrees Centigrade to 63 degrees Centigrade; the addition of prior art untreated crumb rubber particles (i.e. the control sample) increased the range to −28 degrees to 80 degrees, while the addition of particles treated according to the present invention increased the range to −33 degrees to 81 degrees. Thus untreated crumb rubber particles increased the high temperature 17 Centigrade degrees, a definite increase in performance at the high end, but also increased the low temperature 3 Centigrade degrees, a decrease in performance at the low end. When the particles are treated according to the present invention, the high temperature is raised 18 Centigrade degrees and the low temperature is lowered 2 Centigrade degrees—an improvement in performance at both ends of the temperature range.

Asphalt AAM-1 shows improvement in both high and low temperature performance with the addition of untreated and treated particles. Untreated particles raise the high temperature 2 Centigrade degrees, and treated particles raise the high temperature an additional 3 Centigrade degrees; untreated particles lower the low temperature 7 Centigrade degrees, and treated particles lower the low temperature an additional 3 Centigrade degrees. Thus the high and low temperatures of asphalt AAM-1 are improved more through the addition of crumb rubber particles that have been treated according to the present invention than through the addition of prior art untreated particles.

Asphalt ABM-1 also shows improvement in both high and low temperature performance with the addition of treated particles. The high temperature was raised 6 Centigrade degrees and the low temperature was lowered 5 Centigrade degrees, for an overall increase in temperature range of 11 Centigrade degrees versus an overall increase in temperature range of 6 degrees Centigrade for untreated particles.

Although the exact mechanism is not known at the present time, FIG. 2 shows a possible mechanism for the creation of carbonium ions and their subsequent conversion to carboxylic sites.

The crumb rubber particles of the present invention also improve the characteristics of prior art polymer modified asphalt such as Stylink™ modified asphalt as produced by Koch Materials, Inc. of Wichita, Kans.

In the case of polymer modified asphalt, the reaction protocol is totally different from that of unmodified asphalt. Polymer modified asphalts are produced by either physically mixing a polymer with asphalt or chemically bonding a polymer with asphalt. In both cases, the structure of the resulting polymer modified asphalt is changed. The addition of the polymers increases the amount of high molecular size materials in the product. This changes the structure of the asphalt and results in an increase in the high temperature stiffness properties of the modified product.

In the reaction of the polymer modified asphalt and the treated particles of the present invention, the free radicals generated in the chemically modified crumb rubber will react first with the polymer part of the polymer asphalt to increase the degree of polymerization, resulting in an increase of large molecular size particles in the system, which increases the high temperature stiffness of the asphalt. The leftover free radicals will try to react with the asphalt functional groups to form perhaps the medium molecular size and small molecular size particles in the asphalt responsible for making the material stiffer at high temperatures and softer at low temperatures, respectively.

Many times there are not many unreacted low molecular size reactants left in the polymer modified asphalt because the amount of polymer added is optimized for high temperature stiffness. Thus further increases in high molecular size particles as a result of the addition of the treated particles of the present invention will not significantly affect the high temperature properties of the polymer modified asphalt. However, the low temperature properties of the polymer modified asphalt are improved by the addition of the treated particles of the present invention.

It has been found that a Navajo asphalt having a 46–22 grading, when modified with Stylink™, a polymer additive that chemically bonds with asphalt, had a grading of 76–16. When the treated particles of the present invention were added to the unmodified asphalt the grading became 63–35, an improvement in both high and low temperature properties over the original asphalt. When the treated particles of the present invention were added to this asphalt that been modified with Stylink™ polymer the grading became 74–28, a slight decrease in high temperature stiffness but a substantial improvement in low temperature properties over the Stylink™ modified asphalt.

Thus it is clear that the interaction of the modified particles of the present invention with polymer modified asphalt is different, both physically and chemically, from the interaction with unmodified asphalt.

I claim:

1. An improved asphalt comprising asphalt and crumb rubber particles, said crumb rubber particles having been treated to produce enhanced carboxylic sites on their surfaces before being added to the asphalt.

2. An improved asphalt as in claim 1 wherein said particles are treated with hydrogen peroxide.

3. An improved asphalt as in claim 2 wherein the treatment of said particles comprises mixing said particles with hydrogen peroxide at an elevated temperature.

4. An improved asphalt as in claim 3 wherein said elevated temperature is approximately 65 to 85 degrees Centigrade.

5. An improved asphalt as in claim 3 wherein said treated crumb rubber particles are added to asphalt that is at a temperature of approximately 143 to 183 degrees Centigrade.

6. An improved asphalt comprising a polymer modified asphalt and crumb rubber particles, said crumb rubber particles having been treated to produce enhanced carboxylic sites on their surfaces before being added to the asphalt.

7. An improved polymer modified asphalt as in claim 6 wherein said particles are treated with hydrogen peroxide.

8. An improved polymer modified asphalt as in claim 7 wherein the treatment of said particles comprises mixing said particles with hydrogen peroxide at an elevated temperature.

9. An improved polymer modified asphalt as in claim 8 wherein said elevated temperature is approximately 65 to 85 degrees Centigrade.

10. An improved polymer modified asphalt as in claim 8 wherein said treated crumb rubber particles are added to asphalt that is at a temperature of approximately 143 to 183 degrees Centigrade.

\* \* \* \* \*